United States Patent
Choi et al.

(10) Patent No.: US 11,663,286 B2
(45) Date of Patent: *May 30, 2023

(54) SERVER SIDE WEB BASED AD STITCHING AND USER SPECIFIC OPTIMIZATION

(71) Applicant: Nativo, Inc., El Segundo, CA (US)

(72) Inventors: Justin Yoo Choi, Newport Coast, CA (US); Oded Cohen, Los Angeles, CA (US)

(73) Assignee: Nativo, Inc., El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/570,224

(22) Filed: Jan. 6, 2022

(65) Prior Publication Data

US 2022/0129517 A1 Apr. 28, 2022

Related U.S. Application Data

(63) Continuation of application No. 17/018,685, filed on Sep. 11, 2020, now Pat. No. 11,250,094, which is a continuation of application No. 16/219,018, filed on Dec. 13, 2018, now Pat. No. 10,817,585.

(60) Provisional application No. 62/598,371, filed on Dec. 13, 2017.

(51) Int. Cl.
| | |
|---|---|
| *G06F 16/957* | (2019.01) |
| *G06Q 30/0241* | (2023.01) |
| *G06F 16/955* | (2019.01) |
| *H04L 67/5681* | (2022.01) |

(52) U.S. Cl.
CPC ........ *G06F 16/9574* (2019.01); *G06F 16/955* (2019.01); *G06F 16/957* (2019.01); *G06Q 30/0277* (2013.01); *H04L 67/5681* (2022.05)

(58) Field of Classification Search
CPC .. G06F 16/9574; G06F 16/955; G06F 16/957; H04L 67/5681; G06Q 30/0277
USPC .......................................................... 709/224
See application file for complete search history.

(56) References Cited

U.S. PATENT DOCUMENTS

| | | | |
|---|---|---|---|
| 8,156,141 B1 * | 4/2012 | Shmulevich | G06F 16/972 709/227 |
| 8,239,491 B1 | 8/2012 | Tsun | |
| 8,924,457 B2 | 12/2014 | Burckart | |
| 9,407,727 B1 | 8/2016 | McCanne | |
| 9,516,091 B2 * | 12/2016 | Burckart | H04L 67/565 |
| 10,817,585 B2 | 10/2020 | Choi | |
| 2003/0217121 A1 * | 11/2003 | Willis | G06F 16/9535 709/219 |
| 2005/0223084 A1 | 10/2005 | Cheng | |
| 2006/0168088 A1 | 7/2006 | Leighton | |

(Continued)

FOREIGN PATENT DOCUMENTS

| | | |
|---|---|---|
| CN | 102662969 | 11/2013 |
| CN | 106980497 | 7/2017 |

*Primary Examiner* — Zi Ye
(74) *Attorney, Agent, or Firm* — Van Pelt, Yi & James LLP

(57) ABSTRACT

A request for a page is received. A page structure and content elements associated with the page are determined. An optimized version of the page is provided at least in part by determining dynamically an optimized content element for the page based at least in part on the determined page structure and the determined content elements associated with the page and including the optimized content element as a static element in the optimized version of the page in place of one of the determined content elements that corresponds to a script.

39 Claims, 6 Drawing Sheets

(56) References Cited

U.S. PATENT DOCUMENTS

| | | |
|---|---|---|
| 2008/0235325 A1 | 9/2008 | Calvert |
| 2009/0100505 A1 | 4/2009 | Shaty |
| 2009/0281989 A1 | 11/2009 | Shukla |
| 2010/0293058 A1 | 11/2010 | Maher |
| 2010/0312821 A1* | 12/2010 | Bannoura ............. G06F 16/958 709/203 |
| 2012/0246017 A1 | 9/2012 | Kleber |
| 2014/0164401 A1* | 6/2014 | Kyaw ................. G06F 16/9535 707/751 |
| 2014/0279043 A1 | 9/2014 | Yi |
| 2015/0095756 A1 | 4/2015 | Aganovic |
| 2015/0143224 A1 | 5/2015 | Kennedy |
| 2018/0189824 A1 | 7/2018 | Yanamadala |

* cited by examiner

SERVER SIDE WEB BASED AD STITCHING AND USER SPECIFIC OPTIMIZATION

CROSS REFERENCE TO OTHER APPLICATIONS

This application is a continuation of U.S. patent application Ser. No. 17/018,685, entitled SERVER SIDE WEB BASED AD STITCHING AND USER SPECIFIC OPTIMIZATION filed Sep. 11, 2020 which is incorporated herein by reference for all purposes, which is a continuation of U.S. patent application Ser. No. 16/219,018, now U.S. Pat. No. 10,817,585, entitled SERVER SIDE WEB BASED AD STITCHING AND USER SPECIFIC OPTIMIZATION filed Dec. 13, 2018 which is incorporated herein by reference for all purposes, which claims priority to U.S. Provisional Patent Application No. 62/598,371 entitled SERVER SIDE WEB BASED AD STITCHING AND USER SPECIFIC OPTIMIZATION filed Dec. 13, 2017 which is incorporated herein by reference for all purposes.

BACKGROUND OF THE INVENTION

The web runs slowly because conventionally pages are loaded via output pages from content management systems (CMS) with ad tags which are generally scripts that are loaded on the client's browser that then call other ad servers or ad tech that then inject ads, handle verification and other ad functions. This is all done on the client side so the web page loads slowly. Since ads are dynamically injected from third parties, ad blockers can block these ads by blocking calls to these third party servers.

Publishers also have a difficult time moving away from their CMS systems since they have built their operations and have their content loaded into systems that house the content and manage the layout and rendering of their pages.

BRIEF DESCRIPTION OF THE DRAWINGS

Various embodiments of the invention are disclosed in the following detailed description and the accompanying drawings.

DETAILED DESCRIPTION

Figure 1A:
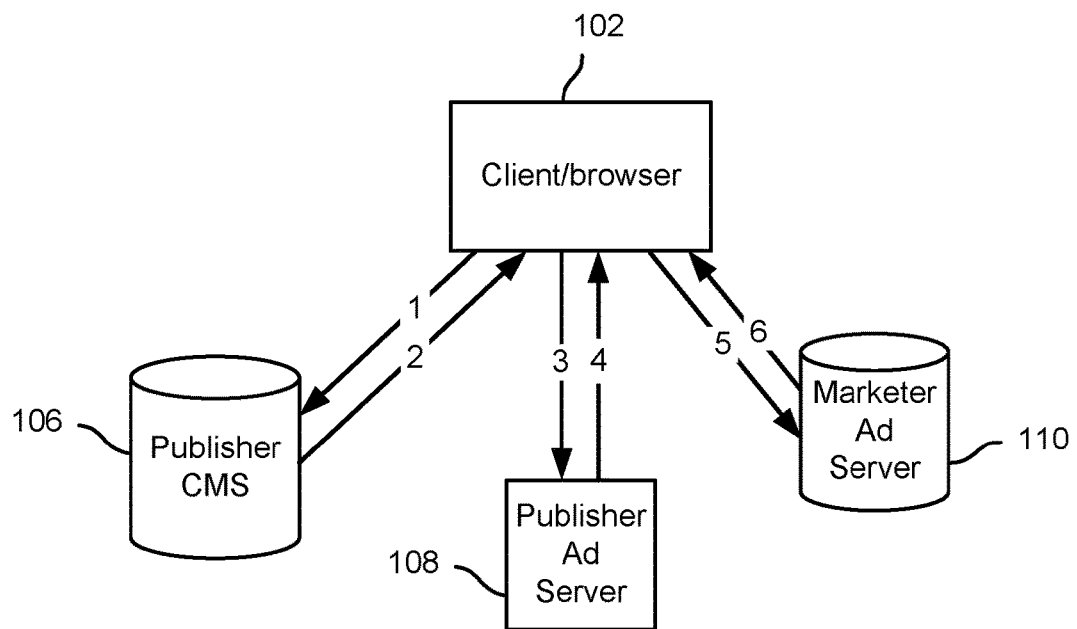
FIG. 1A is a block diagram illustrating an embodiment of a prior art system to serve web pages and ads.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Techniques are disclosed to compose in real time and serve a quick-loading, personalized version of a web page. In various embodiments, a publisher's web page is retrieved and parsed to determine its structure and to identify and extract content elements. A request for the web page associated with a user is responded to at least in part by composing in real time a version of the page personalized for the user. In some embodiments, publisher content elements may be selected and/or reordered based at least in part on information about the user, e.g., demographic data, user-specific content consumption metrics, page-related consumption metrics, other analytics, etc. In some embodiments, ads or other third party content elements (native ads, targeted ads, product offerings, sponsored ads or articles, banner ads, sponsored video, and/or other sponsored content) are selected based at least in part on the user. Ad content is stitched into the personalized page, prior to serving the page, and ad-related scripts are stripped out of and/or omitted from the page resulting in a much faster-loading page as experienced at the user/client/browser end. In some embodiments, limited scripts may be included in the page, such as scripts to verify ad content was displayed and/or viewed at the user/client/browser, scripts to monitor content consumption, etc. In some embodiments, the system optimizes the type of script being added to the page based on what type of ads are being returned, reducing the code running on the page.

FIG. 1A is a block diagram illustrating an embodiment of a prior art system to serve web pages and ads. In the example shown, a client 102, e.g., a computer system, mobile device, etc. using browser software and/or a mobile app with an embedded browser, is used to request (arrow "1") a publisher page from a publisher's content management system 106. For example a user may have selected a link or entered in a navigation or search field a URL associated with the publisher page. The publisher content management system 106 returns an HTML, page (arrow "2") that includes the content and/or further links/scripts to retrieve additional content. The client 102 begins to render the page and executes scripts included in the page, e.g., JavaScript™, resulting in one or more ad calls (arrow "3") being sent to the page publisher's ad server 108 (e.g., DoubleClick™ for Publishers or another hosted ad server), which returns responsive ad information, such as an ad tag indicated an ad selected to be displayed to the user. In a typical scenario, there may be multiple calls to the publisher ad server 108, e.g., loading JavaScript™, making 1-2 calls until the ad tag is returned, etc. The response from the publisher's ad server 108 directs the client 102 to a third party ad server 110 to obtain ad creative content, e.g., video, images, scripts, etc. (arrows "5", "6"). The client/browser 102 only then has all the (publisher plus ad) content required to fully render the originally requested page.

In the example shown in FIG. 1A, the client/browser 102 interacts with five different remote entities (106, 108, 110) to obtain and render the originally requested page. Each interaction is made over a relatively slow client-server connection from the client/browser 102 to the remote node, and multiple interactions are done to obtain and render content comprising the originally requested page. In a typical real world scenario, many more interactions than those shown in FIG. 1A may be required, e.g., to track ad impressions, etc.

Figure 1B:
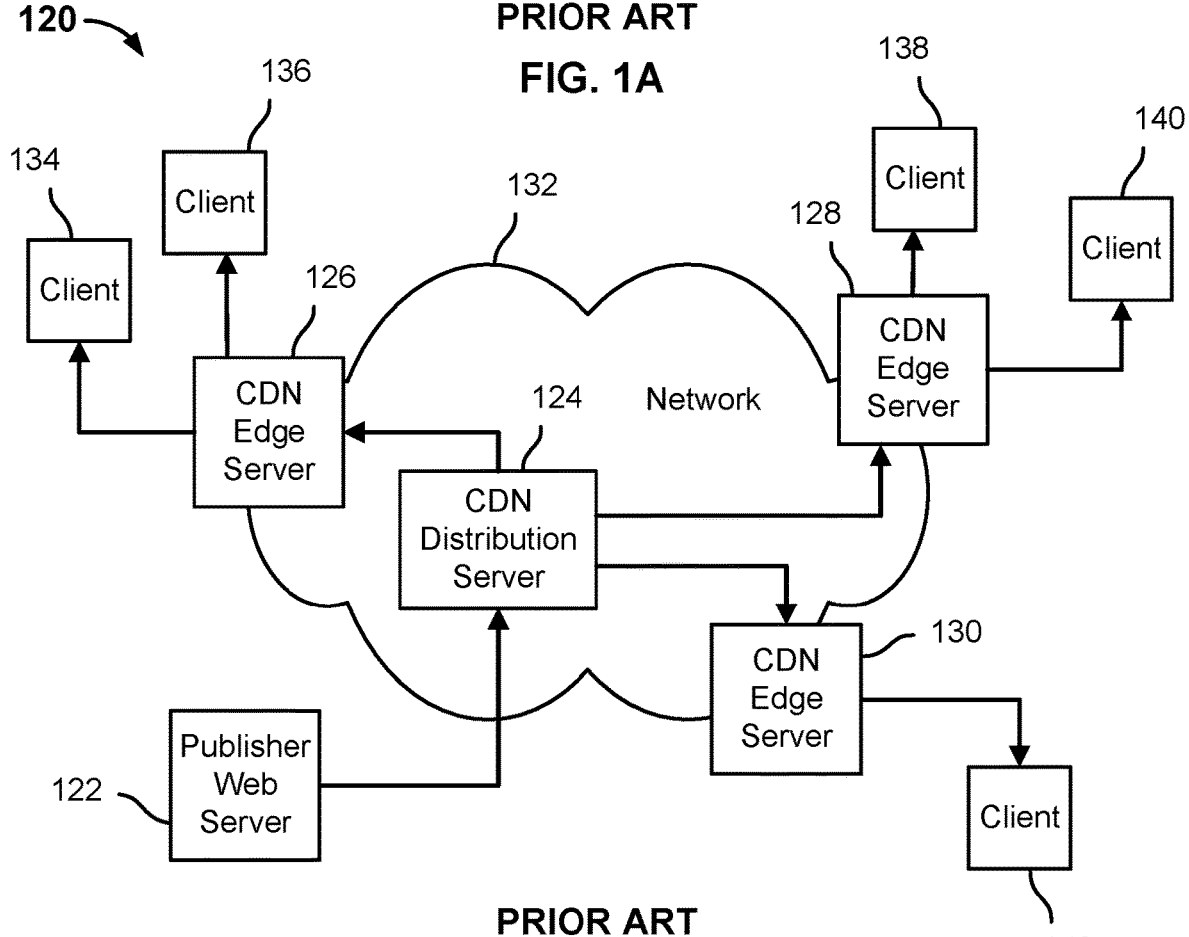
FIG. 1B is a block diagram illustrating an embodiment of a prior art system to distribute web page content.

FIG. 1B is a block diagram illustrating an embodiment of a prior art system to distribute web page content. In the example shown in FIG. 1A, the content distribution network 112 may be implemented as shown in FIG. 1B. In the example shown, content distribution network (CDN) 120 includes a CDN distribution server 124, which is configured to retrieve web page content from publisher servers, such as publisher web server 122. When a request for a page is received, for example, the CDN 120 pulls the latest page version from the publisher CMS/web server and may or may not cache the page for further/future distribution. CDN distribution server 124 distributes via network 132 and stages copies of the content on geographically distributed CDN edge servers such as CDN edge servers 126, 128, and 130. Clients requesting a web page associated with the publisher web server 122 (or other publishers) may be directed to obtain the content from nearby CDN edge servers. In the example shown, for example, clients 134 and 136 may be directed to CDN edge server 126, clients 138 and 140 to CDN edge server 128, and client 140 to CDN edge server 130. In this manner, a requesting client may be directed to obtain a copy of the content from a CDN edge server that is nearer to the requesting client (e.g., in terms of geography, region, distance, network topology, etc.) than other CDN edge servers and/or the publisher web server 122.

While the use of CDN's such as CDN 120 of FIG. 1B enables content to be downloaded more quickly to requesting clients than if a CDN were not used, as FIG. 1A illustrates in the conventional approach a client/browser still must execute a number of scripts and engage in a series of interactions with multiple nodes to obtain and render the publisher and other (e.g., ad) content comprising a web page.

Techniques are disclosed to generate and serve in real time a quick-loading web page comprising user-specific, optimized content. In various embodiments, a CDN or other edge server is configured to provide in response to a request, e.g., from a client/browser associated with a user, a page comprising content optimized for the user. In some embodiments, one or more scripts associated with obtaining ads to be rendered on the page are omitted from the page as sent to the client/browser. Instead, ad content to be displayed to the user in the context of the page is obtained on the server side and included in the page prior to the page being served to the client/browser. Conventional techniques to identify ad content for the user may be performed in various embodiments on the server side, prior to serving the page, to enable ad content targeted to the requesting user to be identified, obtained, and integrated into the page prior to the page being served to the client/browser. In some embodiments, cache headers are used to ensure that the page returned to the specific user/browser will be used once and only once, allowing the content (e.g., the ads) to be updated for every new request made by a browser.

In various embodiments, publisher content optimized for the user may be determined, obtained, and included in a page prior to being served to the client/browser, as disclosed herein. In some embodiments, user- and/or publisher content element-specific metrics may be used to determine for a given user with respect to a given page request the publisher content elements to be included in the page as served and/or the order and/or placement of publisher and/or ad content elements comprising the page.

In some embodiments, content publishers are enabled to customize the site-ads and editorial for each user. The position of the editorial can be varied on each subsequent visit, frequency cap the appearance of articles for that user or move the top article to the bottom position if the user already read that article. In some embodiments, user behavior and location data are used to optimize the editorial and ad layout of the sites and automatically optimize it based on subsequent engagement data.

In various embodiments, ads or other content may be integrated into a publisher's page using one or more techniques described in U.S. Pat. No. 9,286,662, issued Mar. 15, 2016, entitled Press Release Distribution System, the entire contents of which are incorporated herein by reference for all purposes.

In some embodiments, third party verification (e.g., JavaScript™) calls and/or other function calls are made at the server, enabling a page to omit the code configured to make the calls from a client to which the page is served.

Figure 2:
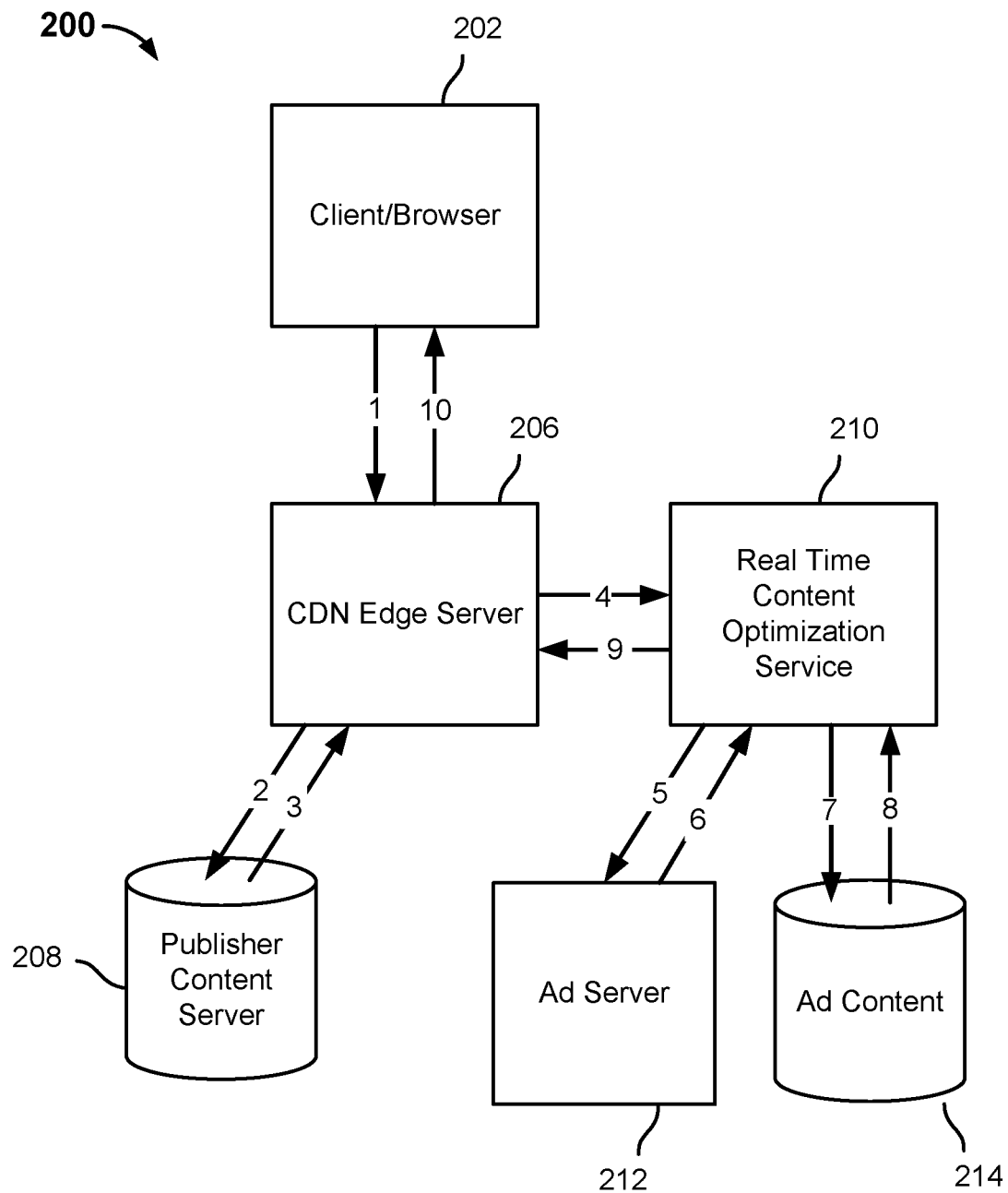
FIG. 2 is a block diagram illustrating an embodiment of a system to provide user-specific optimized content.

FIG. 2 is a block diagram illustrating an embodiment of a system to provide user-specific optimized content. In the example shown, system 200 includes a client/browser 202 that requests (arrow "1") a publisher page. The request is resolved (e.g., through DNS routing, such as CNAME) to a CDN edge server 206. CDN edge server 206 is configured to obtain publisher content for the page from the publisher's content server 208, e.g., the publisher's content management system (CMS) (arrows "2" and "3"). In various embodiments, the CDN edge server 206 may be configured to cache the publisher page, e.g., for a prescribed time.

The CDN edge server 206 provides the publisher page (arrow "4") to a real time content optimization server 210, along with the original page URL (i.e., the request by the user associated with client/browser 202) and information about the requesting user (e.g., from a cookie on the client/browser 202). In some alternative embodiments, the real time content optimization server 210 obtains the publisher page directly from the publisher content server 208. In various embodiments, real time content optimization server 210 parses the publisher page to determine its structure and to extract component publisher content elements (e.g., articles, images, video, etc.) and advertising-related and other scripts. In some embodiments, scripts are parsed to determine meta-information required to identify and obtain ad content, e.g., ad content targeted for the user based on the user information received by the real time content optimization server 210 from the CDN edge server 206. In some embodiments, observed and/or user-configured preferences of the user may be used by the real time content optimization server 210 to identify/select ads for the user.

In various embodiments, real time content optimization server 210 interacts (arrows "5" and "6") with a third party ad server 212 to identify one or more ads to be included in the page, and obtains ad content (arrows "7" and "8") from a source of ad content 214. In some alternative embodiments, only ad HTML is injected to the page, and when the browser 202 renders the page (with the ads), the browser 202 fetches the relevant multiple-media files, such as images, from the source of ad content 214. The real time content optimization server 210 in various embodiments injects/includes the obtained ad content in the ad locations (slots) it selects, e.g., based on publisher rules and/or criteria in some embodiments, to be included in the page.

In some embodiments, real time content optimization server 210 optimizes publisher content as included in the page. For example, real time content optimization server 210 may adapt the editorial (publisher) content to better fit the user's preference. This may include, but is not limited to, promoting articles the user is likely to read, demoting articles already read by this specific user etc.

In various embodiments, consumption of publisher content elements, by an individual user and/or across users, is tracked and used to optimize the selection and/or placement of content. In some embodiments, content consumption is tracked as disclosed in U.S. Pat. No. 9,912,768, entitled MEASURING CONTENT CONSUMPTION, issued Mar. 6, 2018, the entire contents of which are incorporated herein by reference for all purposes.

In various embodiments, real time content optimization server 210 composes and returns to the CDN edge server 206 (arrow "11") a flattened (e.g., ad-related JavaScript and/or other scripts omitted) and optimized (e.g., publisher content elements ads selected and/or placement optimally for the requesting user) page. The CDN edge server 206 serves the page (arrow "12") to the client/browser 202, which is able to render the page relatively quickly, since at least some of the ad-related scripts are not included and the required publisher and ad content are included in the page as served. In addition, techniques disclosed herein result in a page being served in which the page HTML is not being changed while the browser needs to render it, since the ads have already been injected, so within a single run, the entire page and ads are rendered.

In some embodiments, ads or other content compatible with the layout of a publisher's page(s) may be determined programmatically. For example, the structure/layout of the publisher's page(s) may be learned and a representation of the structure stored. In some embodiments, layout changes may be detected automatically. For example, the publisher's pages may be crawled periodically and/or on an ongoing basis, and new and/or newly-structured pages may be detected and their structure learned and stored. In some embodiments, techniques are used to quickly extend to other publisher pages page structure information gleaned previously from other pages having a same/similar structure, e.g., other pages of that same publisher. In some embodiments, page structure may be learned as disclosed in U.S. Pat. No. 9,880,994, entitled DETECTING COMPATIBLE LAYOUTS FOR CONTENT-BASED NATIVE ADS, issued Jan. 30, 2018, the entire contents of which are incorporated herein by reference for all purposes.

Figure 3:
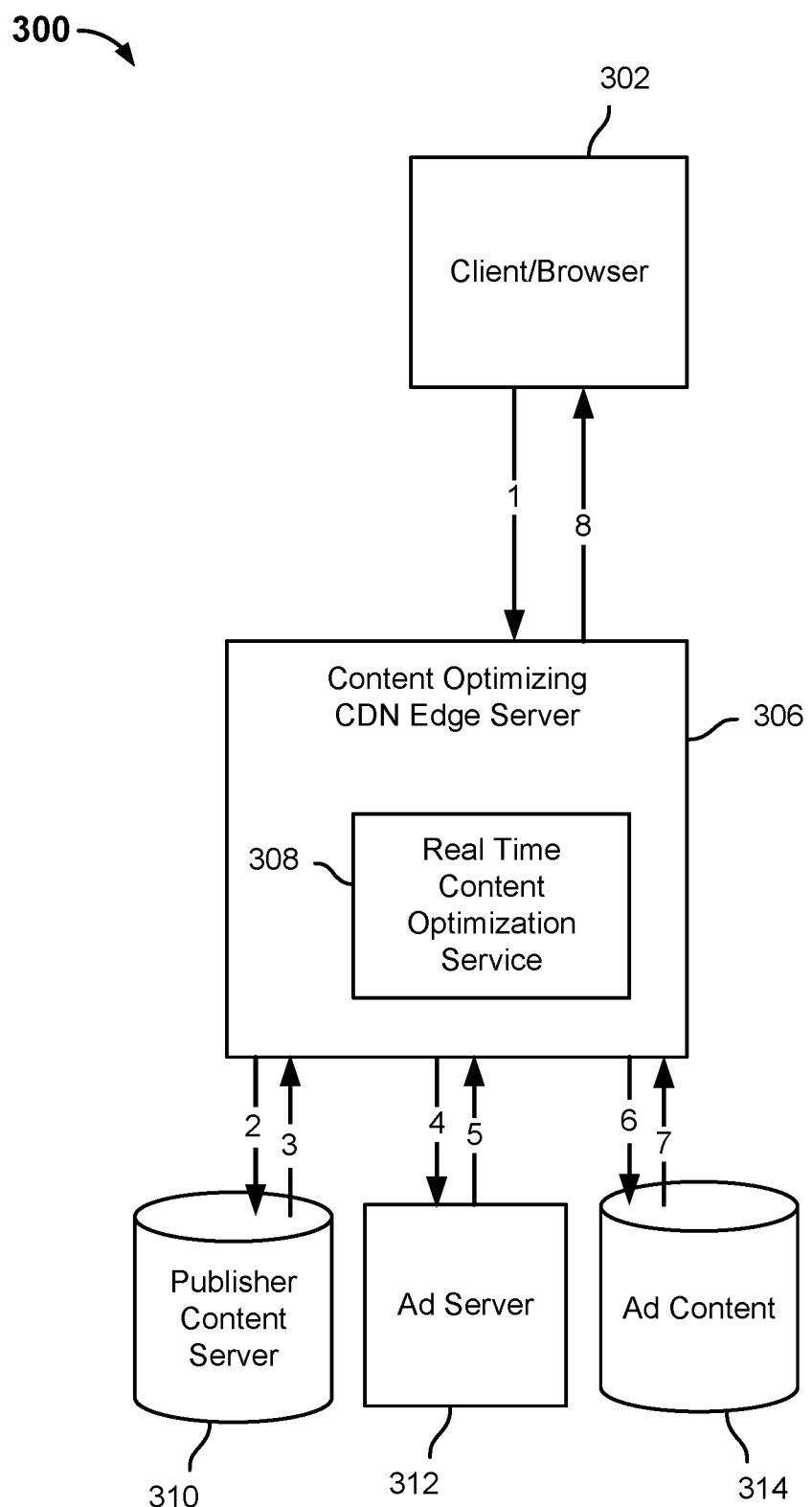
FIG. 3 is a block diagram illustrating an embodiment of a system to provide user-specific optimized content.

FIG. 3 is a block diagram illustrating an embodiment of a system to provide user-specific optimized content. The system 300 is similar in some respects to the system 200 of FIG. 2, except that in the example shown in FIG. 3 the real time content optimization server and/or its function(s) has/have been integrated into a content optimizing CDN edge server 306.

In the example shown in FIG. 3, a client/browser 302 requests (arrow "1") a publisher page and request is resolved to a content optimizing CDN (or other) edge server 306. Edge server 306 includes real time content optimization service 308 (e.g., as co- or locally hosted server, a module, etc.). In various embodiments, real time content optimization service 308 determines publisher and ad content for and composes a page optimized for the requesting user, e.g., as described above in connection with real time content optimization server 210. Specifically, in the example shown, real time content optimization service 308 obtains publisher page structure information and/or publisher content elements from publisher content server 310 (arrows "2" and "3"); identifies ads targeted to the user via a call to ad server 312 (arrows "4" and "5"); and obtains ad creative content from ad content server/network 314 (arrows "6" and "7"). Real time content optimization service 308 uses the obtained page structure information, publisher content element information and content, and ad information and content to compose a flattened (e.g., some/all ad scripts omitted, publisher and ad content included statically) page to be served to the requesting client/browser 302 (arrow "8"). In some alternative embodiments, the ad creative content (video, images, etc.) is obtained by the client/browser 302 directly from a source of ad content, e.g., ad content 314.

In some embodiments, a system similar to that shown in FIG. 3 is used, except that the real time optimization service 308 is hosted in a separate server interposed between the CDN edge server 306 and the publisher content server 310, ad server 312, and ad content 314. In some such embodiments, the CDN edge server 306 does not retrieve page content for a publisher page from the publisher content server 310 (e.g., publisher's CMS) and instead obtains the page, fully flattened (e.g., ads stitched in, etc.) as disclosed herein, from the real time optimization service 308.

Figure 4:
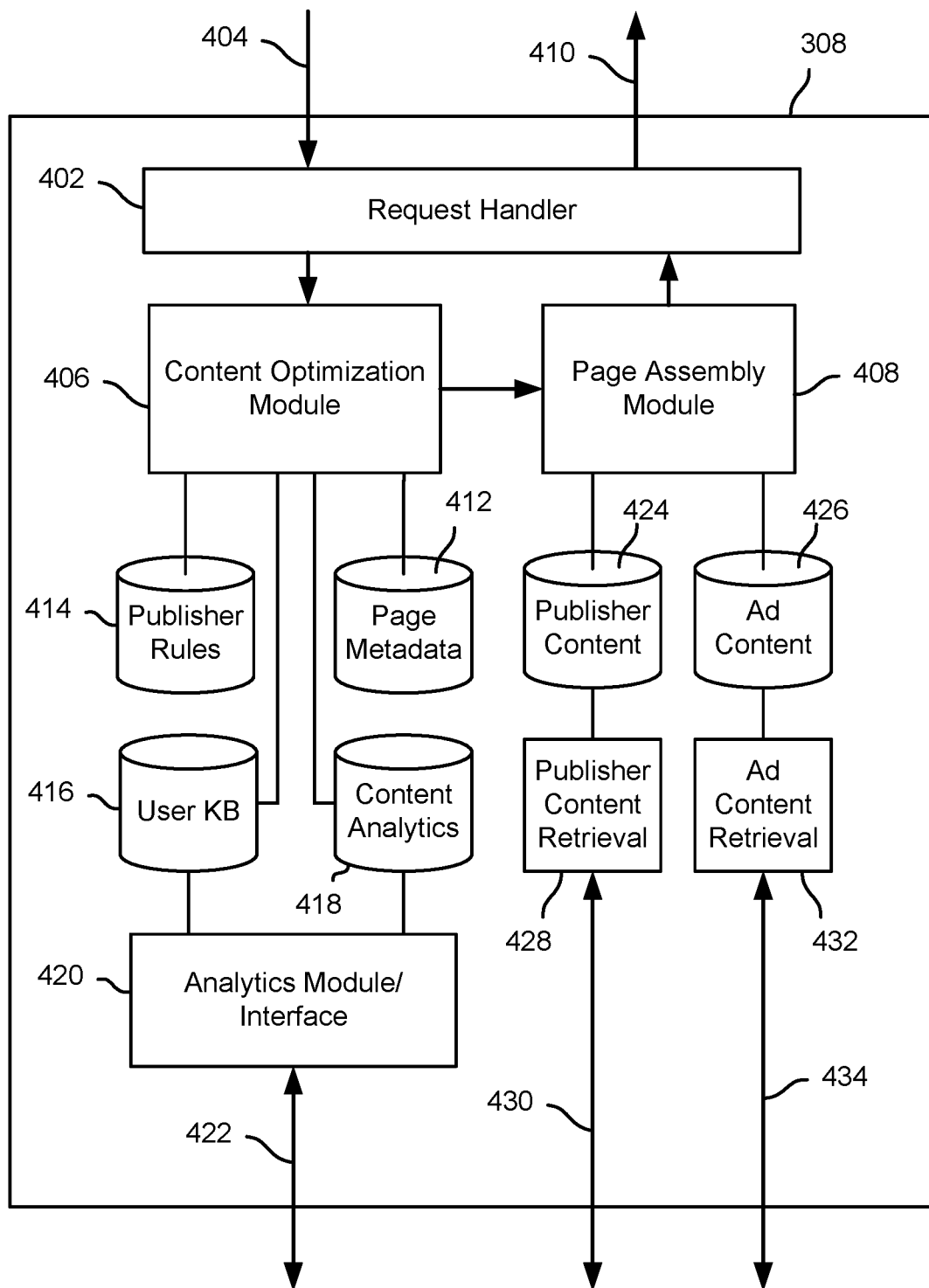
FIG. 4 is a block diagram illustrating an embodiment of a content optimization server/service.

FIG. 4 is a block diagram illustrating an embodiment of a content optimization server/service. In various embodiments, real time content optimization service 308 of FIG. 3 and/or real time content optimization server 210 of FIG. 2 may be implemented at least in part as shown in FIG. 4. In the example shown, real time content optimization service 308 includes a request handler 402 that processes requests 404 for publisher pages received via an internal or external (e.g., network) communication interface. Request handler 402 passes the page request (e.g., URL, requesting client) and associated user information (e.g., user identifier or other identifier, e.g., from a cookie or other source) to content optimization module 406. In various embodiments, content optimization module 406 comprises a set of one or more processes and associated data structures configured to determine page structure and content (publisher and/or ad content) to compose and serve a page with content optimized for the requesting user, as disclosed herein.

In the example shown, content optimization module 406 uses page metadata stored in page metadata database 412 to determine the page structure of the requested page. In various embodiments, the page structure may have been learned by previously crawling and parsing the page and/or a page having a similar structure, and storing a representation of the page structure in page metadata database 412. In some embodiments, if the page structure is not already known the page is retrieved, e.g., from the publisher's content management system, and the page is parsed and analyzed in real time to determine its structure. For example, processing may be performed to determine the page is similar in structure to a page processed previously and for which a representation of the page structure was stored previously. Or, the page structure may simply be determined in real time. In some embodiment, page structure is determined in the background and the page is returned "as is" for the first few calls, until the structure of the page has been learned.

In this example, content optimization module 406 consults and applies publisher rules 414 to determine optimized content for the page. Publisher rules 414 may be configured a priori by or on behalf of the publisher to indicate the publisher's preferences and/or requirements as to which content elements on which pages may be optimized in which manner. For example, a publisher may prescribe or otherwise define a rule that limits the reordering of content elements so that the topmost content element is never moved, is always moved, and/or may (only) under prescribed conditions be moved to a lower position in the page. In another example, a publisher may establish a rule that no more than a prescribed number or proportion of content elements may be replaced and/or reordered, or that content elements in adjacent/consecutive page locations may not be replaced. Additional examples of publisher rules include, without limitation, rules based on geolocation of the user, time of day, day of the week, or season of the year; rules based on the number of times the same user has been shown the same or similar content; etc.

Content optimization module 406 also uses information about the user with whom the request is associated. User identify information receive with the request 404 is used to access information about the user from a user knowledge base 416. In various embodiments, user knowledge base 416 may contain user-specific information about the individual user. For example, information read from cookies placed previously on the user's browser may be used to observe the user's browsing history and/or habits.

In some embodiments, the real time content optimization service 308 receives from the client a request that include first-party (publisher) cookies associated with the publisher's site domain and ad server cookies. The real time content optimization service 308 identifies the source of each cookie and sends each to its owner. The real time content optimization service 308 merges received cookies and cookies being written as first party (under the site domain) and returns a response. In some embodiments, real time content optimization service 308 adds an additional cookie sync pixel for first time users. The pixel sends a request to a third party ad server (with the third-party cookie). The ad server returns third-party cookie information and redirects back to the real time content optimization service 308 to complete the cookie sync process.

In some embodiments, tags or code on or associate with publisher pages served to the user may generate content consumption metrics specific for that user with high granularity. For example, the amount of time the user spent interacting with each specific content element on a page (e.g., video clip, image, retailer product browsing widget, other ads or sponsored content, individual article summaries, etc.) may be observed and reported and used update the user's record in the user knowledge base 416. In some embodiments, demographic, geolocation, and/or other information about the user may be used to access from user knowledge base 420 information about what content the user may respond to more favorably, e.g., based on observation of content consumption metrics across users in that same demographic, geographic region, etc.

User knowledge base 416 may also include information identifying which content elements (publisher content, ads) the user has already seen, e.g., in previously-accessed publisher pages, and/or how many times and in which locations the content was displayed. In some embodiments, this information may be used to determine placement within the page of a content element. For example, an article the user has seen once before may be placed lower in the page, or may be placed lower or even omitted based on previously observed interaction of the user with that content.

In the example shown, user information is used along with content analytics data 418 to select optimized content for the user. For example, the performance of each individual content element, whether publisher content or ad content, may be tracked over time and content elements determined to generate higher interest from users and/or from users like the requesting user may be more likely to be included in the page as composed for and served to this requesting user.

In various embodiments, the user knowledge base 416 and content analytics data 418 are updated continuously and/or periodically by analytics module/interface 420. In various embodiments, analytics module/interface 420 may receive raw content consumption and/or user data and analyze the data locally to populate and/or update user knowledge base 416 and/or content analytics data 418, and/or analytics module/interface 420 may receive a report or representation of analysis performed centrally and sent to analytics module/interface 420 via communications interface 422.

In various embodiments, content optimization module 406 uses one or more of the request 404 and associated user information received from request handler 402; page metadata 412; publisher rules 414; user knowledge base 416; and content analytics 418 to determine optimized content to be included in a page to be served in response to the request 404. In some embodiments, a real time call may be made to an ad server, such as ad server 312, to determine an optimal, targeted ad to be included in the page. In some alternative embodiments, an ad may be selected based on page metadata 412, which may include continuously updated data concerning ads to be targeted to users based on user attributes, other user information, and/or page information. In some embodiments, an ad may be determined in real time via an auction or other competitive marketplace, conducted by the real time content optimization service 308 or a third party service. In various embodiments, the functionality of a full ad stack (multiple ad formats, all targeting capabilities, auctions, etc.) are embedded into a server side process, as disclosed herein.

In the example shown in FIG. 4, the content optimization module 406 passes to page assembly module 408 the page structure and identification and placement of publisher and ad content elements to be included in the page. Page assembly module 408 retrieves the publisher content from a publisher content store 424 and the ad content from ad content store 426, and uses the page structure and placement information to compose the page.

In various embodiments, publisher content may be retrieved in advance by publisher content retrieval module and/or process 428, via communication interface 430. For example, over time publisher pages may be crawled by publisher content retrieval module and/or process 428 and the pages parsed to extract individual content elements that may be subject to be reordered and/or replaced by sponsored (e.g., ad) content. Page metadata 412 may be updated to reflect the page structure and/or to include identification of the content elements and/or attributes of and/or other metadata relating to the individual content elements. In some embodiments, the latter metadata may be used to identify and select the content element(s) to be included in a given page in response to a request. In some embodiments, if not already presented publisher content for a page may be retrieved in real time, and the page processed in real time to extract the page structure and content elements.

In some embodiments, the caching of pages is done based on the publisher CMS cache settings. If the publisher configures its CMS to allow caching for certain amount of time (like age HTTP header), or allows caching and just verifying the page (e.g., using ETAG) the content optimization stores a local copy. "Prefetching" and "crawling" as described herein are used in various embodiments to understand what other content exists on the publisher's site, including content that might not be promoted currently on all pages, and is available to be presented to a specific user as part of the rules/recommendations from the content optimization module.

Likewise, in various embodiments ad content 426 may be obtained in advance and cached, in this example by ad content retrieval module and/or process 432 via communication interface 434, and/or may be obtained in real time. In some embodiments, ads are not cached, and are instead selected and retrieved dynamically per request, based on the user, geolocation, time considerations (e.g., pacing), etc.

In various embodiments, the optimized page composed by page assembly module 408 as described herein is provided to the request handler 402 and is returned to the requesting user as page 410. In various embodiments, the page 410 includes content optimized for the user as disclosed herein. The page 410 in various embodiments includes no JavaScript™ or other code required to be executed by the requesting client/browser to retrieve ads or publisher content. In some embodiments, limited JavaScript™ or other code may be included at the bottom of the page, e.g., to track and report content consumption metrics as described herein, to provide verification that an ad or other content has been displayed to the user, etc.

In some embodiments, ad verification code is not included on the page. Instead, real time content optimization service 308 and/or one or more other components of content optimizing edge server 306 execute the verification script on behalf of the requesting client and/or otherwise provides verification to the advertiser and/or ad service or network.

In various embodiments, providing a page with content optimized for the user and minimal scripts provides a page having content much more likely to be of interest to the user while providing a more desirable user experience since the page loads and displays fully much more quickly. In various embodiments, caching publisher and/or ad content on the edge server 306 and/or offloading to the much higher capacity processors and network connections of the edge server 306 tasks such as publisher content retrieval, ad identification, and ad content retrieval, enables an optimized page to be served and displayed much more quickly than under prior approaches, such as those illustrated in FIG. 1A.

(see my comments above about caching pages or ads) In various embodiments, an optimized page provided to a first user as disclosed herein may be cached for a limited time, e.g., at an edge server such as edge server 306 of FIG. 3. In some embodiments, such a cached page may be served to a second user determined to be (sufficiently) similar to the first user, e.g., if a request for the same publisher page is received from the second user while the page remains available in the cache. For example, a vector or other representation of the user attributes of the first user may be stored and associated with the cached page. A subsequent request received from the second user may be processed in part by determining a corresponding vector for the second user. If the distance/difference between the vectors is less than a prescribed threshold, the cached page is served to the second user. If not, a page optimized for the second user is constructed and served, as disclosed herein.

In some embodiments, techniques disclosed herein are used to determine optimal content and/or placement across users. For example, "A/B" testing may be performed by serving versions A and B of a page to different and/or overlapping sets of similar users. User engagement for a content element of interest is measured, and the page and/or content version that performs best may be served to subsequent users who request the page.

Figure 5A:
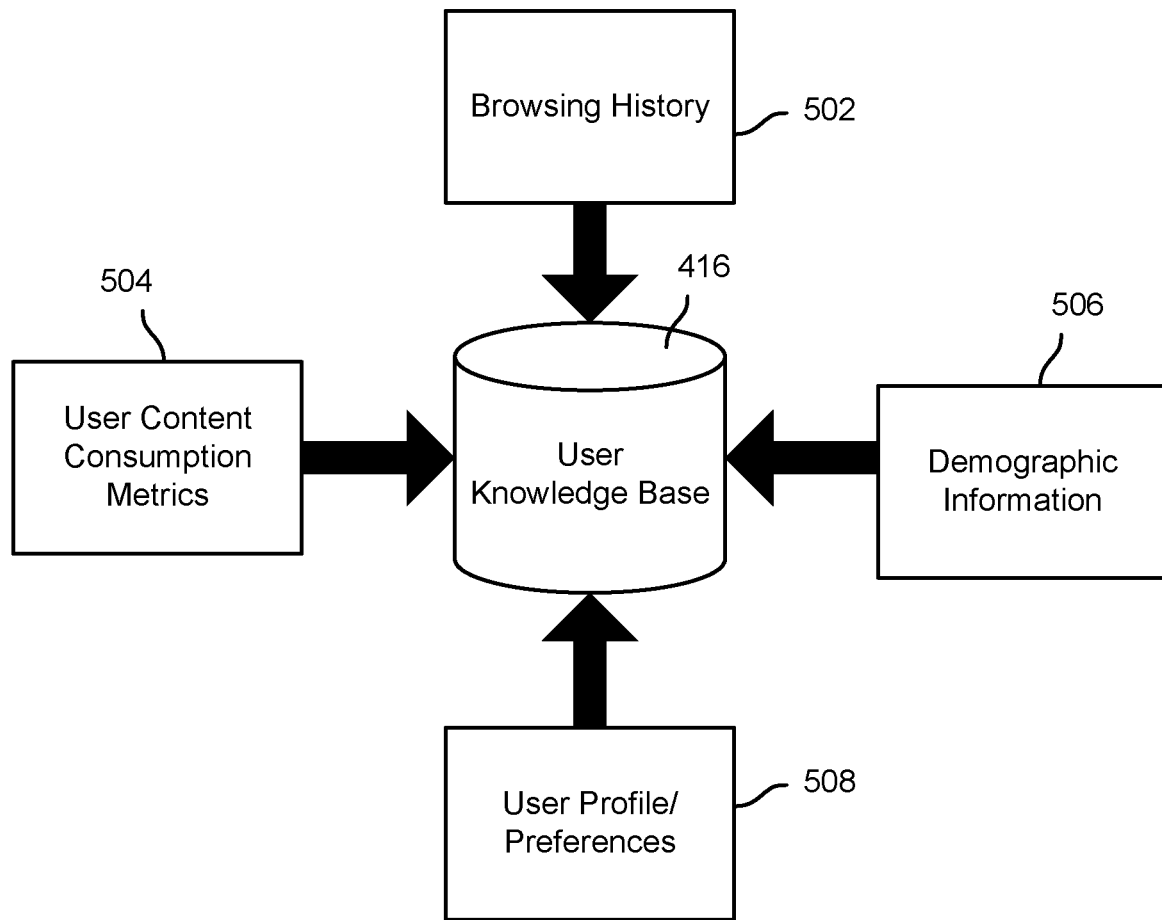
FIG. 5A is a block diagram illustrating an embodiment of a system to create and maintain a user knowledge base.

FIG. 5A is a block diagram illustrating an embodiment of a system to create and maintain a user knowledge base. In the example shown, user knowledge base 416 is shown to include data reflecting user browsing history 502, user content consumption metrics 504, demographic information 506, and user profile/preference information 508. In various embodiments, user browsing history 502 is determined from one or more cookies placed previously on the user's browser. User content consumption metrics 504 in various embodiments is gathered by scripts and/or agents running on the user's client/browser and includes information reflecting user interaction with ads or other content elements, such as time displayed, amount of video viewed, etc. Demographic information 506 may include information known, learned, or inferred about the user, e.g., based on content consumption habits, purchases, etc. In some embodiments, a location is associated with the request, e.g., based on the source IP address. User profile/preference data 508 may in some embodiments include preferences explicitly indicated by the user (e.g., don't show me ads or content like this; or expressing interest in user-selected subjects, etc.) and/or user demographic or other information expressly indicated and/or learned or inferred about the user.

Figure 5B:
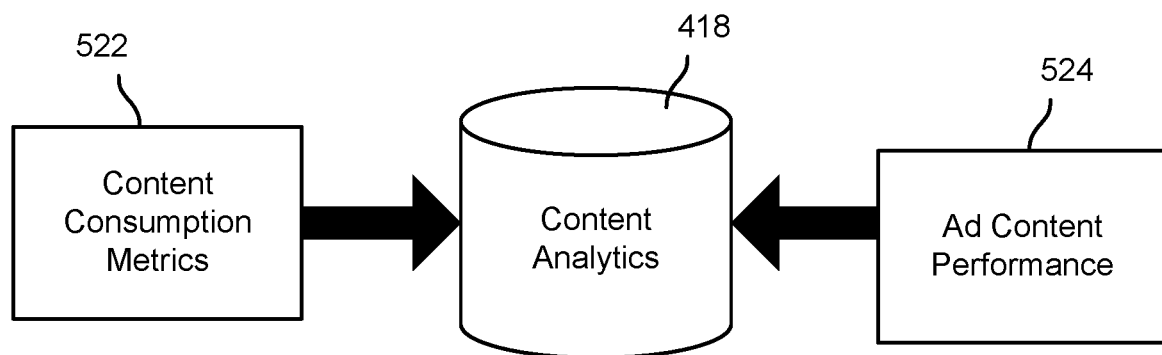
FIG. 5B is a block diagram illustrating an embodiment of a system to create and maintain a content analytics knowledge base.

FIG. 5B is a block diagram illustrating an embodiment of a system to create and maintain a content analytics knowledge base. In this example, content analytics data 418 includes content consumption metrics 522 and ad content performance 524. In some embodiments, publisher content and ad content are treated similarly, as content elements available to be included in an optimized page. In some embodiments, content analytics data 418 includes normalized data enabling the performance and/or level of interest for a given user of content elements to be determined and compared, whether they comprise publisher content or ad content.

Figure 6:
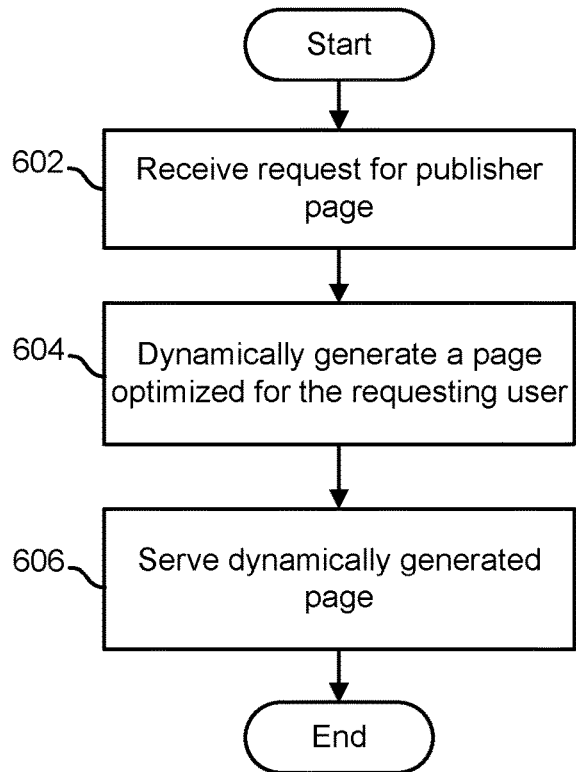
FIG. 6 is a flow chart illustrating an embodiment of a process to provide user-specific optimized content.

FIG. 6 is a flow chart illustrating an embodiment of a process to provide user-specific optimized content. In various embodiments, the process of FIG. 6 is performed wholly and/or in part by an edge server, such as edge server 306 of FIG. 3. In the example shown, a request for a publisher page is received (602). A page optimized for a user with whom the request is associated is generated dynamically (604) and served to the user (606).

Figure 7:
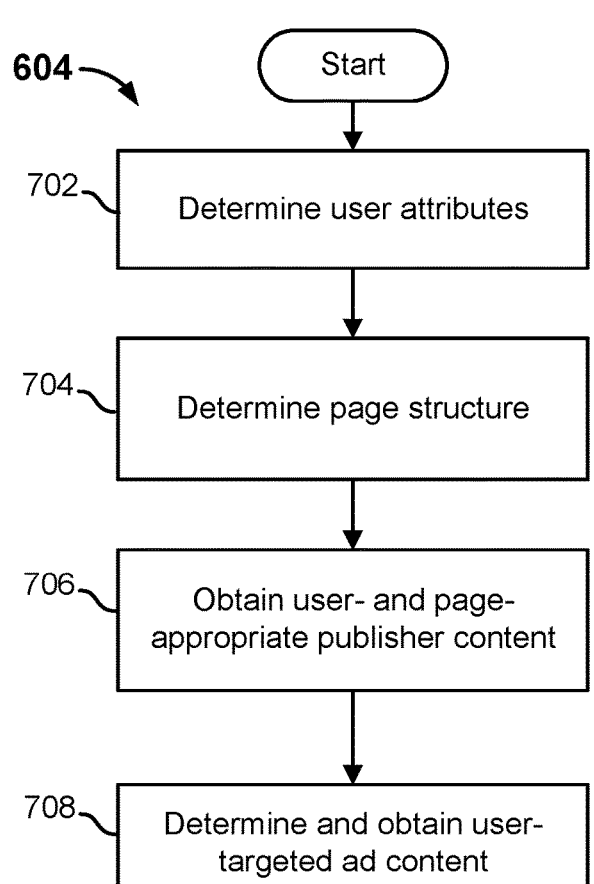
FIG. 7 is a flow chart illustrating an embodiment of a process to generate dynamically a web page comprising user-specific optimized content.

FIG. 7 is a flow chart illustrating an embodiment of a process to generate dynamically a web page comprising user-specific optimized content. In various embodiments, the process of FIG. 7 is performed to implement step 604 of the process of FIG. 6. In the example shown, attributes of a user with whom a page request is associated are determined (702). A page structure of the requested page is determined (704). Publisher content appropriate for the page and optimized for the user is obtained (706). Ad content targeted for the user is determined and obtained (708). The page structure, publisher content, ad content, and content placement determined to be optimized for the user are used to compose a page optimized for the user (710).

Figure 8:
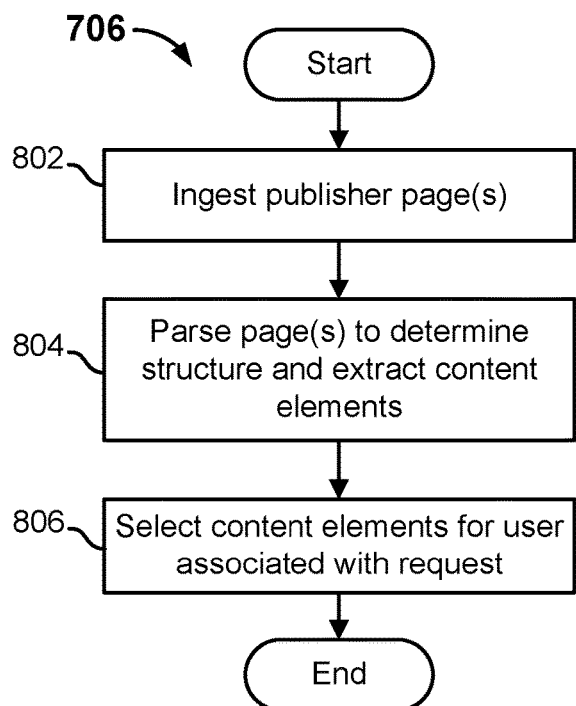
FIG. 8 is a flow chart illustrating an embodiment of a process to determine user-specific content to be included in a dynamically generated optimized web page.

FIG. 8 is a flow chart illustrating an embodiment of a process to determine user-specific content to be included in a dynamically generated optimized web page. In various embodiments, the process of FIG. 8 is used to implement step 706 of the process of FIG. 7. In the example shown, publisher pages are ingested (e.g., crawled) (802). The publisher pages are parsed to determine page structure and extract content elements (804). In some embodiments, the page structure information is stored in a database, such as page metadata store 412 of FIG. 4. Extracted content elements may be cached in a publisher content store, such as publisher content store 424 of FIG. 4. Content elements optimized for the user, based on the user's attributes, are selected to be included in a page to be served in response to the request (806).

In various embodiments, techniques disclosed herein may be used to serve ads optimized for the user, even if the user is using ad blocking technologies to prevent or interfere with ad calls from the browser. In various embodiments, techniques disclosed herein may increase user interest in publisher and/or ad content provided to the user via a publisher's pages, increasing user interest and loyalty to the publisher and its pages, resulting in increased ad revenue and other benefits to the publisher. By enabling ad-related and other JavaScript™ to be omitted from pages as served to a user, and by offloading to much faster server processors and connections the task of determining and retrieving publisher and ad content, a faster page loading and browsing experience may be provided to users who navigate to a publisher's page(s).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a communication interface configured to receive a request for a page; and
a processor coupled to the communication interface and configured to:
determine a page structure and content elements associated with the page; and
provide an optimized version of the page at least in part by determining dynamically an optimized content element for the page based at least in part on the determined page structure and the determined content elements associated with the page and including the optimized content element as a static element in the optimized version of the page in place of one of the determined content elements that corresponds to a script.

2. The system of claim 1, wherein the system comprises a server.

3. The system of claim 1, wherein the system comprises an edge server.

4. The system of claim 1, wherein the system comprises an edge server associated with a content distribution network.

5. The system of claim 1, wherein the optimized content element is determined based at least in part on a browsing history of a user.

6. The system of claim 1, wherein the optimized content element is determined based at least in part on a content consumption metric associated with a user.

7. The system of claim 1, wherein the optimized content element is determined based at least in part on previous user engagement with the optimized content element.

8. The system of claim 1, wherein a placement of the optimized content element within the optimized version of the page is determined based at least in part on previous user engagement with the optimized content element.

9. The system of claim 1, wherein the optimized content element is determined based at least in part on a content consumption metric associated with the optimized content element.

10. The system of claim 1, wherein the optimized content element is determined based at least in part on a demographic or other personal attribute of a user.

11. The system of claim 1, wherein the processor is further configured to determine an optimal placement of the optimized content element within the optimized version of the page.

12. The system of claim 1, wherein the processor is further configured to use the page structure and a user attribute to determine an optimal placement of the optimized content element within the optimized version of the page.

13. The system of claim 1, wherein the processor utilizes page metadata stored in a metadata database to determine the page structure associated with the page.

14. The system of claim 1, wherein to determine the page structure associated with the page, the processor is configured to:
retrieve the page;
parse the page; and
analyze the page to determine the page structure.

15. The system of claim 1, wherein the optimized content element comprises publisher content.

16. The system of claim 1, wherein the optimized content element comprises a dynamic content.

17. The system of claim 1, wherein the optimized version of the page comprises a first optimized version of the page and the processor is further configured to perform testing to compare performance of the first optimized version of the page with a second optimized version of the page.

18. The system of claim 1, further comprising a memory or other storage device and wherein the processor is further configured to cache the optimized content element in the memory or other storage device.

19. The system of claim 1, further comprising a memory or other storage device and wherein the processor is further configured to store in the memory or other storage device a representation of the page structure associated with the page.

20. A method, comprising:
receiving a request for a page; and
using a processor to:
determine a page structure and content elements associated with the page; and
provide an optimized version of the page at least in part by determining dynamically an optimized content element for the page based at least in part on the determined page structure and the determined content elements associated with the page and including the optimized content element as a static element in the optimized version of the page in place of one of the determined content elements that corresponds to a script.

21. The method of claim 20, wherein the optimized content element is determined based at least in part on a browsing history of a user.

22. The method of claim 20, wherein the optimized content element is determined based at least in part on a content consumption metric associated with a user.

23. The method of claim 20, wherein the optimized content element is determined based at least in part on previous user engagement with the optimized content element.

24. The method of claim 20, wherein a placement of the optimized content element within the optimized version of the page is determined based at least in part on previous user engagement with the optimized content element.

25. The method of claim 20, wherein the optimized content element is determined based at least in part on a content consumption metric associated with the optimized content element.

26. The method of claim 20, wherein the optimized content element is determined based at least in part on a demographic or other personal attribute of a user.

27. The method of claim 20, further comprising determining an optimal placement of the optimized content element within the optimized version of the page.

28. The method of claim 20, further comprising using the page structure and a user attribute to determine an optimal placement of the optimized content element within the optimized version of the page.

29. The method of claim 20, further comprising utilizing page metadata stored in a metadata database to determine the page structure associated with the page.

30. A computer program product embodied in a non-transitory computer readable medium and comprising computer instructions for:
    receiving a request for a page; and
    determining a page structure and content elements associated with the page; and
    providing an optimized version of the page at least in part by determining dynamically an optimized content element for the page based at least in part on the determined page structure and the determined content elements associated with the page and including the optimized content element as a static element in the optimized version of the page in place of one of the determined content elements that corresponds to a script.

31. The computer program product of claim 30, wherein the optimized content element is determined based at least in part on a browsing history of a user.

32. The computer program product of claim 30, wherein the optimized content element is determined based at least in part on a content consumption metric associated with a user.

33. The computer program product of claim 30, wherein the optimized content element is determined based at least in part on previous user engagement with the optimized content element.

34. The computer program product of claim 30, wherein a placement of the optimized content element within the optimized version of the page is determined based at least in part on previous user engagement with the optimized content element.

35. The computer program product of claim 30, wherein the optimized content element is determined based at least in part on a content consumption metric associated with the optimized content element.

36. The computer program product of claim 30, wherein the optimized content element is determined based at least in part on a demographic or other personal attribute of a user.

37. The computer program product of claim 30, further comprising computer instructions for determining an optimal placement of the optimized content element within the optimized version of the page.

38. The computer program product of claim 30, further comprising computer instructions for using the page structure and a user attribute to determine an optimal placement of the optimized content element within the optimized version of the page.

39. The computer program product of claim 30, further comprising computer instructions for utilizing page metadata stored in a metadata database to determine the page structure associated with the page.

* * * * *